(12) United States Patent
Chiles et al.

(10) Patent No.: US 6,303,905 B1
(45) Date of Patent: Oct. 16, 2001

(54) HEATING ELEMENT CONSTRUCTION FOR FLOOR WARMING SYSTEMS

(75) Inventors: Richard M. Chiles; Daniel T. Chiles, both of Springfield, MO (US)

(73) Assignee: Bask Technologies LLC, Springfield, MO (US)

(*) Notice: Subject to any disclaimer, the term of this patent is extended or adjusted under 35 U.S.C. 154(b) by 0 days.

(21) Appl. No.: 09/648,042

(22) Filed: Aug. 25, 2000

(51) Int. Cl.[7] .............................. H05B 1/00; H05B 3/00; H05B 11/00
(52) U.S. Cl. ......................... 219/213; 392/435; 219/544
(58) Field of Search .................................. 219/213, 218, 219/528, 544, 545; 165/56; 392/455

(56) References Cited

U.S. PATENT DOCUMENTS

| | | |
|---|---|---|
| 2,533,409 | 12/1950 | Tice . |
| 2,884,509 | 4/1959 | Heath . |
| 2,938,992 | 5/1960 | Crump . |
| 3,015,016 | 12/1961 | Cole . |
| 3,235,712 | 2/1966 | Watson . |
| 3,255,337 | 6/1966 | Willat . |
| 3,356,835 | 12/1967 | Watson . |
| 3,425,020 | 1/1969 | Toyooka et al. . |
| 3,627,988 | 12/1971 | Romaniec . |
| 3,697,728 | * 10/1972 | Stirzembecher ............... 219/213 |
| 3,721,800 | * 3/1973 | Elser ............................ 219/213 |
| 4,063,069 | 12/1977 | Peeri . |
| 4,071,052 | 1/1978 | Vasek et al. . |
| 4,247,756 | * 1/1981 | Cucinotta et al. ............. 219/528 |
| 4,363,947 | 12/1982 | Bergersen . |
| 4,439,666 | 3/1984 | Graham . |
| 4,538,054 | 8/1985 | de la Bretoniere . |
| 4,581,522 | * 4/1986 | Graham ........................ 219/545 |
| 4,620,085 | * 10/1986 | Horikawa et al. ............ 219/528 |
| 4,725,717 | * 2/1988 | Harrison ...................... 219/528 |
| 4,733,057 | 3/1988 | Stanzel et al. . |
| 4,752,717 | 6/1988 | Mental . |
| 4,814,585 | 3/1989 | Klein . |
| 4,855,567 | * 8/1989 | Mueller ....................... 219/218 |
| 4,990,744 | * 2/1991 | Willner ........................ 219/213 |
| 4,990,774 | 2/1991 | Smith, Jr. et al. . |
| 5,151,577 | 9/1992 | Aspden . |
| 5,218,185 | 6/1993 | Gross . |
| 5,410,127 | 4/1995 | LaRue et al. . |
| 5,814,792 | * 9/1998 | Wildi ........................... 219/544 |
| 5,829,979 | 11/1998 | Kobashigawa et al. . |
| 5,908,573 | 6/1999 | Chiles et al. . |
| 6,020,578 | * 2/2000 | Putz ............................. 219/545 |
| 6,049,063 | * 4/2000 | Barber ......................... 219/213 |
| 6,092,587 | * 7/2000 | Ingram ......................... 165/56 |
| 6,188,838 | * 2/2001 | Penella ........................ 392/435 |

FOREIGN PATENT DOCUMENTS

| | | | |
|---|---|---|---|
| 0 383 152 | 8/1990 | (EP) . | |
| 3-07035359 | * 2/1995 | (JP) | ............... F24D/13/02 |
| 08096942 | * 4/1996 | (JP) | ............... H05B/3/56 |

\* cited by examiner

Primary Examiner—Teresa Walberg
Assistant Examiner—Leonid Fastovsky
(74) Attorney, Agent, or Firm—Shook, Hardy & Bacon LLP

(57) ABSTRACT

A heating element construction for a mesh mat used in an underfloor heating system. The heating element includes a heater wire having one or more conductors spirally wound around a center strand and an insulating jacket surrounding the conductor. The heater wire is doubled back on itself to provide two counterflow portions which are spirally wrapped around each other. The electric current flows in opposite directions in the two counterflow portions to cancel the electromagnetic field. A braided metal ground shield surrounds the heater wire. A protective outer cover surrounding the ground shield resists abrasion and water.

20 Claims, 2 Drawing Sheets

HEATING ELEMENT CONSTRUCTION FOR FLOOR WARMING SYSTEMS

FIELD OF THE INVENTION

This invention relates generally to floor warming systems and more particularly to an improved heating element of the type incorporated in a meshwork mat that is installed under finished floors.

BACKGROUND OF THE INVENTION

As disclosed in U.S. Pat. No. 5,908,573, floor warming systems are known that incorporate electrically resistive heating elements. The heating element may be threaded through a meshwork mat which is in turn embedded in a floor beneath tiles, carpeting, or other finished flooring materials. The heating elements can be energized using household AC power, and they then apply heat to the floor in order to warm it as well as the overlying space.

Products of this type have been subject to a number of problems, most notably in the area of safety. One problem that can create a safety hazard occurs when workers installing either the floor warming system or the flooring materials inadvertently drive metal fasteners such as nails or staples into the heating elements or their lead wiring. The fastener can then be in contact both with a heating element conductor and another metal object such as a metal reinforcing rod or wire, a shower pan, or metal pipes extending in the floor. If the system is thereafter energized in this condition, a person may be standing on the shower pan or be in contact with a plumbing fixture or other metal object that is supplied with current through the short circuit provided by the fastener. This creates the potential for electrocution even if a ground fault circuit interrupter (GFCI) or other electrical protection device is installed.

Remodeling of floors in which floor warming systems have already been installed can also create safety hazards. Existing heating elements for floor warming systems have been provided with ground shields that are formed in a construction referred to as a "serve" construction. A serve type shield includes a series of wires wrapped in parallel around the heating wires in order to physically protect them and to provide an electrical ground for them. A serve wire construction provides less than satisfactory physical protection against sharp objects such as nails, staples, or pointed trowels of the type commonly used when laying tile. Consequently, the serve shield can be penetrated by the sharp metal objects, and this can expose remodeling workers to a potentially lethal electrical shock if the heating element is energized.

The serve shield may have enough wire to carry sufficient current to trip a GFCI protective device. However, if such protection is not installed or is installed improperly or is not functioning for some reason, a serve type shield has insufficient wire capacity to carry the current to ground in order to interrupt the electrical circuit. For this reason, the potential for lethal shocks is present when remodeling activity takes place and particularly in the absence of effective GFCI protection.

For the floor to be adequately warmed, the heating elements must be concentrated in a relatively dense pattern. As a result, the heating elements generate a significant electromagnetic fields (EMF) when current flows through them. Electromagnetic fields have been associated with medical problems including cancer, memory loss, and interference with the absorption of prescription drugs. Electrical appliances have been specially designed and redesigned in recent years to provide protection against undue human exposure to electromagnetic fields. However, many electric floor warming systems have at best minimal shielding against EMF exposure, so persons who are in proximity to the floor warming system can be subjected to possibly harmful electromagnetic fields.

SUMMARY OF THE INVENTION

In view of the problems associated with the current state of electric floor warming technology, it is evident that a need exists for a heating element that is safer than those that have been provided in the past. It is the primary goal of the present invention to provide a heating element that is improved in its construction and particularly in its safety aspects.

More specifically, it is an object of the invention to provide, in a floor warming system, a heating element that is constructed to exhibit enhanced mechanical and physical properties while at the same time exhibiting improved electrical performance, particularly with respect to effective grounding of the heating element.

Another object of the invention is to provide a heating element of the character described that is arranged to utilize the current flow in a manner to substantially eliminate any measurable electromagnetic field.

In accordance with the invention, these features are provided by a heating element which is constructed for use with a mesh mat and which has a special duplex construction. The invention includes a heater wire that is arranged such that it provides a pair of counterflow portions spiraled around one another and covered by a braided metal ground shield as well as an outer protective cover that provides water and abrasion resistance. The heater wire may include one or more conductors wrapped around a center strand of non-conductive material. The heater wire is continuous but is doubled back on itself to provide the counter current portions in which the electrical current flows in opposite directions to cancel the electromagnetic field. An insulating jacket surrounds the conductive part of the heater wire.

A fully braided metal ground shield surrounds the two counterflow heater wire portions to both physically protect them and provide effective electrical grounding. A braided shield has sufficient mechanical strength to resist puncturing better than the weaker serve type shields that have been used in the past. At the same time, the braided construction enhances the current carrying capacity of the ground shield so that, unlike a serve construction, it is able to carry the current to ground to interrupt the circuit even if a protective device such as a GFCI is not present or is not working. Consequently, even if a nail, a staple, a trowel, or any other metal object is able to penetrate the wiring, workers are not subject to electrocution even in the absence of effective GFCI protection.

Additionally, the novel construction of the heating element of this invention leads to further advantages, including ease of installation, reliability in operation, and improved lead wiring that exhibits safety and cost benefits.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 4:
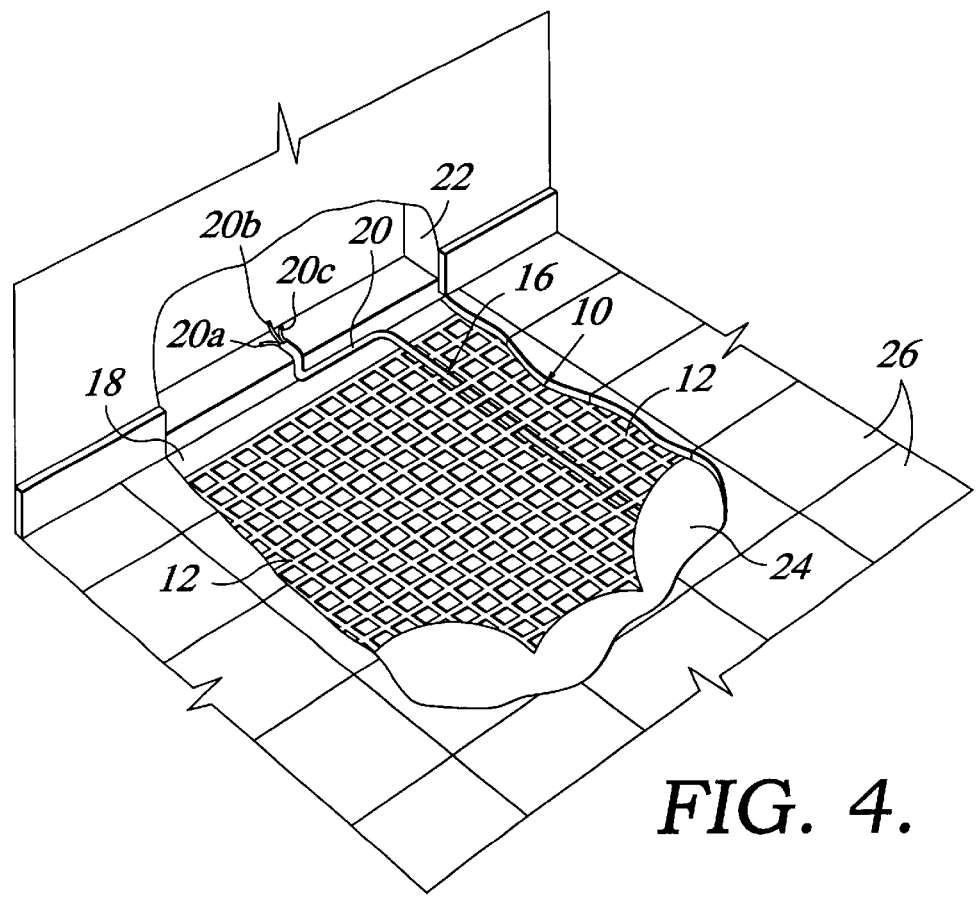
FIG. 4 is a fragmentary perspective view showing a floor warming mat constructed in accordance with the present invention installed in a tile floor, with portions broken away for purposes of illustration.

Referring now to the drawings in more detail and initially to FIG. 4 in particular, numeral 10 generally designates an electrical floor warming system of the type that incorporates a heating element constructed in accordance with the present invention. The floor warming system includes one or more mesh mats 12 which are constructed of crisscrossing and interconnected strands or fibers 14 (see FIG. 1). In accordance with the present invention, an improved heating element which is generally identified by numeral 16 is threaded through the mesh openings provided in each of the mats 12. The mats 12 are laid on a subfloor 18. Lead wiring 20 commonly referred to as "cold leads" connects with the heating element 16 and may be extended along the subfloor into a wall such as the wall 22 in which suitable electrical connections may be made.

When the floor warming system is installed, the mats 12 are laid in the desired pattern on the subfloor 18 and may be embedded in mortar 24 which is used for the setting of tiles 26 forming the finished flooring material. The finished floor may be a different finishing material such as marble, stone, vinyl, carpeting or the like.

Figure 1:
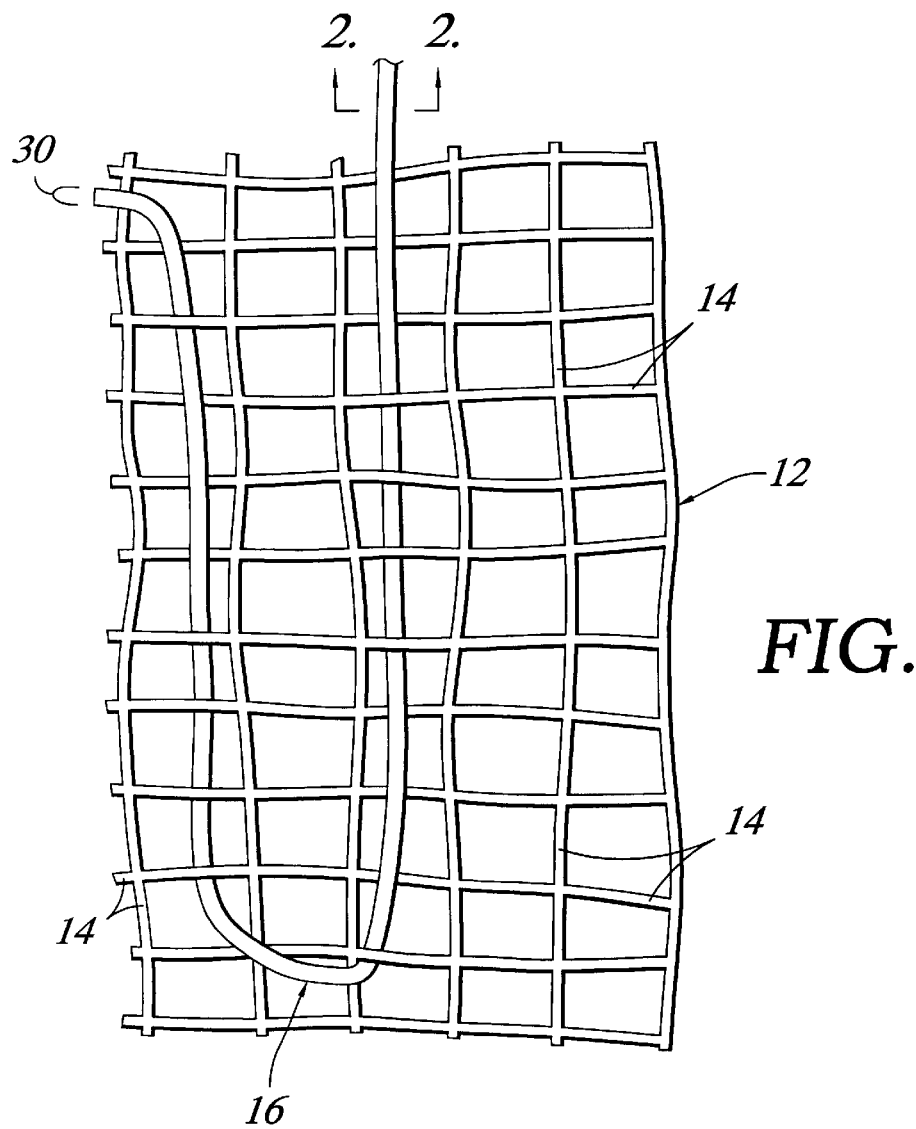
FIG. 1 is a fragmentary plan view of a mesh mat through which a heating element constructed according to a preferred embodiment of the present invention is threaded for use in a floor warming system.
Figure 2:
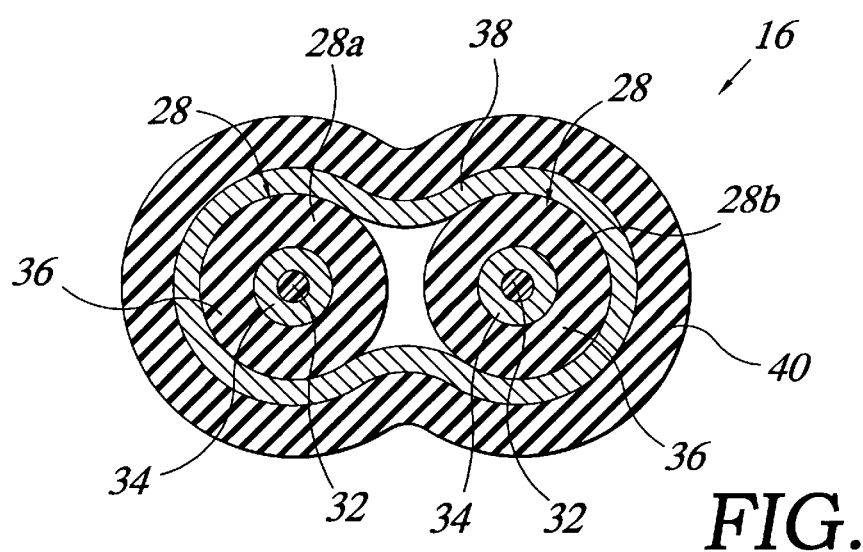
FIG. 2 is a sectional view on an enlarged scale taken through the heating element generally along line 2—2 of FIG. 1 in the direction of the arrows.

The details of the construction of the heating element 16 are best shown in FIG. 2. The heating element 16 includes a heater wire which is generally identified by numeral 28. The heater wire 28 is doubled back on itself in looped fashion as indicated diagrammatically at 30 in FIG. 1. This doubling or looping back of the heater wire 28 on itself provides two counterflow portions 28a and 28b which are preferably spirally wound together. Because of the doubling back of the heater wire on itself, the electric current flow through the portions 28a and 28b is in opposite directions. Portions 28a and 28b are thus counterflow portions of the heater wire. Because of this counter current flow and because the counterflow portions 28a and 28b are in close proximity to one another, the electromagnetic fields that are generated by the portions 28a and 28b cancel one another such that the net electromagnetic force is zero or very close to zero.

Figure 3:
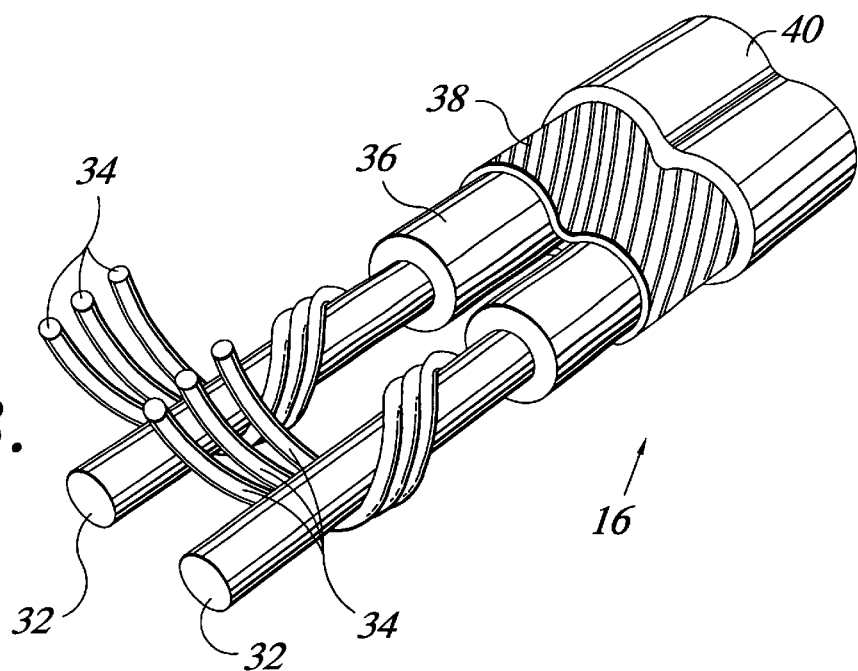
FIG. 3 is a perspective view of a heating element constructed in accordance with the present invention, with portions broken away to illustrate internal details.

The heater wire 28 preferably includes a center strand 32 constructed of a nonconducting material. A suitable material is commercially available under the trademark TEFZEL which is in the nature of a plastic that does not significantly conduct electricity. The heater wire 28 also includes one or more conductors 34 which may be spirally wound around the center strand 32 to provide a relatively dense wiring pattern. As shown in FIG. 3, the heater wire may be provided with a number of separate conductors 34 which are wrapped side by side in spiral fashion around the center strand 32. FIG. 3 depicts three of the conductors 34, but other numbers can be used, including a single conductor arrangement. The number of conductors depends largely upon the application and on how dense a wiring pattern is desired.

The heater wire 28 further includes an insulating jacket 36 which surrounds the conductor or conductors 34 in order to provide electrical insulation. The entire heater wire 28, including the center strand 32, conductors 34 and insulating jacket 36, is doubled back on itself in order to negate the EMF, as previously indicated.

The heater wire 28, after being doubled back on itself, is surrounded by a braided metal ground shield 38 which is formed by interweaving a plurality of strands of a suitable metal. The thickness of the braided ground shield 38 can vary, but the shield should be thick enough to provide puncture resistance to sharp objects such as nails, staples, and pointed trowels. The braid of the shield 38 should be tightly woven to provide adequate physical protection for the heater wire 28 which is contained within it. The shield 38 serves as an electrical ground for the heating element, and the interwoven metal strands should be dense enough to be capable of carrying electrical current back to the grounding connection which will be described in more detail.

The final part of the heating element 16 is an outer protective cover 40 which should be abrasion resistant and water resistant to provide physical protection for the underlying materials as well as a barrier against the entry of water. The cover 40 should also be electrically nonconductive. A material that is suitable for the cover 40 is a commercially available material sold under the trademark TEFZEL.

When the floor warming system 10 is installed, the heating element 16 is woven or threaded through the mesh openings of the mat 12 in the manner illustrated in FIG. 1. As shown in FIG. 4, the lead wiring 20 includes a hot wire 20a which is connected to one end of each of the conductors 34 and a neutral wire 20b which is connected to the other end of each conductor 34. The lead wiring 20 includes a ground wire 20c that is suitably connected to the ground shield 38.

When the floor warming system is energized with electric current, the current is applied through the conductors 34 which generate heat due to their electrical resistance, and the heat is transmitted to the tiles 26 and to the space that is immediately above the floor. The ground shield 38 provides physical protection to the heater wire 28 and also serves as an electrical ground that is able to carry current back to the electrical ground of the system and thereby interrupt the energizing electrical circuit in the event of a ground fault condition. Normally, a protective device such as a ground fault circuit interrupter (GFCI) is provided, and it is quickly tripped in the usual fashion in the event of an electrical problem. However, the provision of the braided ground shield 38 results in the ground system having sufficient current carrying capacity to carry the current back to the main circuit panel if a ground fault occurs and there is no GFCI protection in the circuit.

During installation of the floor warming system 10 or the flooring materials, the braided ground shield 38 provides mechanical protection for the heater wire 28. Due to the mechanical strength of the braided construction of the shield 38, the shield is not penetrated by nails, staples or pointed trowels of the type commonly used to spread the mortar 24 during laying of the tiles 26. Even if a nail or other metal fastener or other metal object is able to penetrate the ground shield 38 and contact the conductors 34 as well as possibly another metal object such as a shower pan, reinforcing element or water or gas pipe, the effective ground provided by the shield 38 prevents potentially lethal electrical hazards from developing. As soon as the circuit is energized in this condition, the short circuit from the conductors 34 to the ground shield 38 through the metal fastener results in the current being carried back to ground through the ground shield 38, thus immediately tripping either the GFCI (if installed and functioning properly) or the circuit breaker in the main electrical panel. Consequently, the circuit breaker is tripped before a person who may be in contact with the shower pan, reinforcing bar or pipe is subjected to a lethal shock. In this fashion, the braided construction of the shield 38 results in added electrical safety as compared to the more conventional serve type shields.

During remodeling work or other activity that may create electrical problems, the construction of the heating element 16 provides improved safety. For example, if a nail or staple is driven into the heating element during remodeling work, the braided shield 38 is usually able to prevent penetration of the fastener to the conductor 34. Even if the shield is penetrated and the conductor is contacted by a metal fastener while the heating element is energized, the ground condition that results between the conductor 34 and the ground shield 38 creates an immediate ground fault, and the shield 38 is able to carry the current back to either the GFCI (if available and functioning) or the circuit breaker at the main electrical panel. Consequently, the circuit is interrupted immediately before workers are subjected to a potentially lethal shock.

In this manner, the improved construction of the heating element 16 provides enhanced safety from an electrical standpoint as well as enhanced mechanical strength which facilitates installation and minimizes physical damage to the heating elements during installation and/or remodeling work.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A heating element for a mesh mat in an electric floor warming system, comprising:
   a heater wire including a continuous conductor for emitting heat when energized by electric current and an insulating jacket surrounding said conductor, said heater wire being doubled back on itself to arrange counterflow portions thereof in proximity to one another with current flowing in opposite directions in the conductors of the counterflow portions;
   a metal shield surrounding said counterflow portions of the heater wire, said shield being adapted for electrical grounding to provide a ground shield; and
   an insulated cover surrounding said shield.

2. A heating element construction as set forth in claim 1, including a center strand around which said conductor is wound.

3. A heating element construction as set forth in claim 1, including a center strand, said conductor comprising multiple wires wound together around said center strand.

4. A heating element construction as set forth in claim 1, wherein said counterflow portions are arranged to spiral around each other.

5. A heating element construction as set forth in claim 4, including a center strand around which said conductor wire is wound.

6. A heating element as set forth in claim 4, including a center strand, said conductor comprising multiple wires wound together around said center strand.

7. A heating element as set forth in claim 4, wherein said shield comprises a braid having interwoven metal strands.

8. A heating element as set forth in claim 2, wherein said shield comprises a braid having interwoven metal strands.

9. A heating element as set forth in claim 1, wherein said shield comprises a braid having interwoven metal strands.

10. A floor warming mat structure comprising:
    a mesh mat adapted for installation beneath finish flooring;
    a heating element threaded through said mat and including a heater wire;
    a continuous conductor in said heater wire for emitting heat when energized by electric current;
    an insulating jacket surrounding said conductor, said heater wire being doubled back on itself to present counterflow portions in proximity to one another arranged such that current flows in opposite directions in the conductors of said counterflow portions;
    a metal ground shield surrounding said counterflow portions of the heater wire, said shield being adapted for electrical grounding to provide a ground shield; and
    an insulated cover surrounding said ground shield.

11. A mat structure as set forth in claim 10, including a center strand around which said conductor is wound.

12. A mat structure as set forth in claim 10, wherein said shield comprises a braid having interwoven metal strands.

13. A floor warming system comprising:
    a mesh mat installed on a floor beneath finish flooring;
    a heater wire comprising a continuous conductor and an insulating jacket surrounding said conductor, said heater wire being doubled back on itself to provide a pair of counterflow portions in proximity to each other in which current flows in opposite directions when said conductor is energized;
    a metal shield surrounding both of said counterflow portions;
    a cover surrounding said shield and including electrical insulation, said wire, shield and cover forming a heating element threaded through said mat; and
    a lead wire for connection to said heater wire to apply electrical power thereto and including a ground connection connected to said shield.

14. A system as set forth in claim 13, including a center strand around which said conductor is wound.

15. A system construction as set forth in claim 13, including a center strand, said conductor comprising multiple wires wound together around said center strand.

16. A system as set forth in claim 13, wherein said counterflow portions are arranged to spiral around each other.

17. A system construction as set forth in claim 16, including a center strand around which said conductor wire is wound.

18. A system as set forth in claim 16, including a center strand, said conductor comprising multiple wires wound together around said center strand.

19. A system as set forth in claim 14, wherein said shield comprises a braid having interwoven metal strands.

20. A system as set forth in claim 13, wherein said shield comprises a braid having interwoven metal strands.

* * * * *